US009350629B2

(12) United States Patent
Johnsen et al.

(10) Patent No.: US 9,350,629 B2
(45) Date of Patent: May 24, 2016

(54) SYSTEM AND METHOD FOR ENSURING INTERNET PROTOCOL (IP) ADDRESS AND NODE NAME CONSISTENCY IN A MIDDLEWARE MACHINE ENVIRONMENT

(71) Applicant: Oracle International Corporation, Redwood Shores, CA (US)

(72) Inventors: Bjørn Dag Johnsen, Oslo (NO); Prabhunandan B. Narasimhamurthy, Bangalore (IN); Predrag Hodoba, Heggedal (NO); Dag Georg Moxnes, Oslo (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 195 days.

(21) Appl. No.: 13/972,698

(22) Filed: Aug. 21, 2013

(65) Prior Publication Data

US 2014/0059215 A1     Feb. 27, 2014

Related U.S. Application Data

(60) Provisional application No. 61/692,164, filed on Aug. 22, 2012.

(51) Int. Cl.
*H04L 12/26* (2006.01)
*H04L 12/24* (2006.01)
*H04L 29/12* (2006.01)

(52) U.S. Cl.
CPC ............ *H04L 43/04* (2013.01); *H04L 41/0866* (2013.01); *H04L 41/0873* (2013.01); *H04L 61/2046* (2013.01); *H04L 41/082* (2013.01); *H04L 41/0876* (2013.01); *H04L 61/2007* (2013.01)

(58) Field of Classification Search
USPC ......................................................... 709/224
See application file for complete search history.

(56) References Cited

U.S. PATENT DOCUMENTS

| 6,014,669 A | * | 1/2000 | Slaughter et al. ............. 707/610 |
| 6,728,780 B1 | | 4/2004 | Hebert |
| 7,451,208 B1 | | 11/2008 | Bakke et al. |
| 2003/0217156 A1 | * | 11/2003 | Datta ...................... A63F 13/12 709/227 |
| 2004/0017769 A1 | | 1/2004 | Denecheau et al. |
| 2004/0098447 A1 | * | 5/2004 | Verbeke et al. ............... 709/201 |

(Continued)

OTHER PUBLICATIONS

International Search Report and Written Opinion dated Dec. 4, 2013, International Application No. PCT/US2013/056258, 11 pages.

(Continued)

*Primary Examiner* — Greg C Bengzon
(74) *Attorney, Agent, or Firm* — Tucker Ellis LLP

(57) ABSTRACT

A system and method can ensure Internet Protocol (IP) address and node name consistency when performing remote transactions via multiple un-related IP addresses for the same remote peer. The system can ensure that all cooperating peer nodes are in full agreement of the names and IP addresses at any point in time. In particular, when network configurations can be updated dynamically, the system can ensure that such updates do not lead to inconsistent or failed transactions because a peer node has a stale view of what addresses to use. Furthermore, the peer node that initiates the transaction can verify that all the other peer nodes have exactly the same view of the overall system configuration, in order to ensure that each distributed transaction is carried out using consistent address information.

12 Claims, 4 Drawing Sheets

(56) References Cited

U.S. PATENT DOCUMENTS

| | | | |
|---|---|---|---|
| 2005/0050227 A1* | 3/2005 | Michelman | H04L 29/12009 709/245 |
| 2005/0105476 A1* | 5/2005 | Gotesdyner | H04L 67/1093 370/254 |
| 2006/0268682 A1 | 11/2006 | Vasseur | |
| 2007/0157303 A1* | 7/2007 | Pankratov | H04L 29/12528 726/11 |
| 2007/0268913 A1 | 11/2007 | Denecheau et al. | |
| 2008/0025226 A1 | 1/2008 | Mogul et al. | |
| 2009/0147698 A1 | 6/2009 | Potvin | |
| 2009/0307522 A1 | 12/2009 | Olson et al. | |
| 2010/0094954 A1* | 4/2010 | Han et al. | 709/219 |
| 2011/0010434 A1* | 1/2011 | Eleftheriou | H04L 61/1582 709/219 |
| 2011/0106921 A1* | 5/2011 | Brown | H04L 41/082 709/221 |
| 2012/0233299 A1* | 9/2012 | Attanasio | G06F 8/60 709/220 |
| 2012/0278455 A1* | 11/2012 | Peng et al. | 709/220 |
| 2013/0246606 A1* | 9/2013 | Branch et al. | 709/224 |
| 2015/0074779 A1* | 3/2015 | Gu | H04L 63/126 726/7 |

OTHER PUBLICATIONS

International Search Report and Written Opinion dated Nov. 20, 2013, International Application No. PCT/US2013/056261, 10 pages.

Sonderegger, J. et al., JUNOS High Availabiility, Aug. 24, 2009, http://proqueset.safaribooksonline.com/book/networking/junos/9780596805449/junos-ha-concepts/control_plane_high_availability#X2ludGVybmFsX0h0bWxWaWV3P3htbGlkPTk30DA1OTY4MDU0NDkIMkZncmFjZWZ1bF9yb3V0aW5nX2VuZ2luZv9zzd2I0Y2hvdmVyX29wZW4mcXVIcnk9 (retrieved on Nov. 13, 2013), pp. 1-5.

Shaikh, A. et al., An OSPF Topology Server: Design and Evaluation, IEEE Journal on Selected Areas in Communications, IEEE Service Center, Piscataway, US, vol. 20, No. 4, May 1, 2002, pp. 746-755.

Jacobson, V. et al., Custodian-Based Information Sharing, IEEE Communications Magazine, IEEE Service Center, Piscataway, US, vol. 50, No. 7, Jul. 1, 2012, pp. 38-43.

International Search Report dated Nov. 20, 2013, International Application No. PCT/US2013/056261 filed Aug. 22, 2013, 4 pages.

International Search Report dated Dec. 4, 2013, International Application No. PCT/US2013/056258 filed Aug. 22, 2013, 4 pages.

* cited by examiner

SYSTEM AND METHOD FOR ENSURING INTERNET PROTOCOL (IP) ADDRESS AND NODE NAME CONSISTENCY IN A MIDDLEWARE MACHINE ENVIRONMENT

CLAIM OF PRIORITY

This application claims priority on U.S. Provisional Patent Application No. 61/692,164, entitled "SYSTEM AND METHOD FOR ENSURING INTERNET PROTOCOL (IP) ADDRESS AND NODE NAME CONSISTENCY IN A MIDDLEWARE MACHINE ENVIRONMENT" filed Aug. 22, 2012, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to a middleware machine environment.

BACKGROUND

The interconnection network plays a beneficial role in the next generation of super computers, clusters, and data centers. For example, the InfiniBand (IB) technology has seen increased deployment as the foundation for a cloud computing fabric. As larger cloud computing architectures are introduced, the performance and administrative bottlenecks associated with the traditional network and storage have become a significant problem.

This is the general area that embodiments of the invention are intended to address.

SUMMARY

Described herein is a system and method that can ensure Internet Protocol (IP) address and node name consistency when performing remote transactions via multiple un-related IP addresses for the same remote peer. The system can ensure that all cooperating peer nodes are in full agreement of the names and IP addresses at any point in time. In particular, when network configurations can be updated dynamically, the system can ensure that such updates do not lead to inconsistent or failed transactions because a peer node has a stale view of what addresses to use. Furthermore, the peer node that initiates the transaction can verify that all the other peer nodes have exactly the same view of the overall system configuration, in order to ensure that each distributed transaction is carried out using consistent address information

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the Internet Protocol (IP) network as an example for a computer network. It will be apparent to those skilled in the art that other types of computer networks can be used without limitation.

Described herein is a system and method that can ensure system configuration consistency, such as IP address and node name consistency, in a middleware machine environment.

Figure 1:
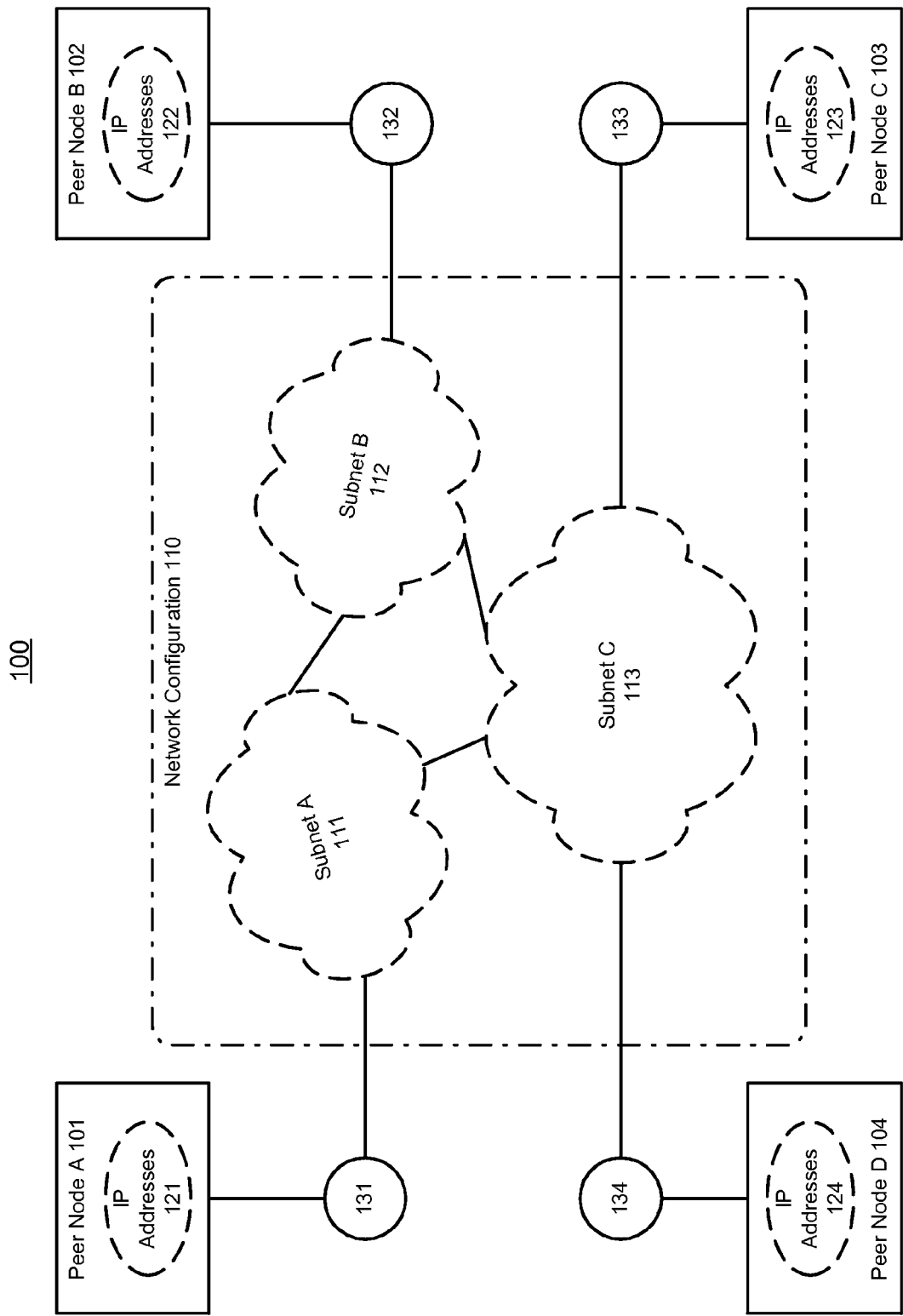
FIG. 1 shows an illustration of supporting distributed transactions using highly available communication in a middleware machine environment, in accordance with an embodiment of the invention.

FIG. 1 shows an illustration of supporting distributed transactions using highly available communication in a middleware machine environment, in accordance with an embodiment of the invention. As shown in FIG. 1, a middleware machine environment 100 can include one or more peer nodes A-D 101-104 that are interconnected via different subnets, e.g. subnets A-C 111-113. Each peer node A-D 101-104 can be associated with different IP addresses, e.g. IP addresses 121-124, and various network interfaces, e.g. network interfaces 131-134.

In accordance with an embodiment of the invention, various distributed transactions can be performed, or implemented, in the middleware machine environment 100, using highly available communication via multiple networks (or subnets) via multiple local network interfaces and multiple independent local and remote IP addresses.

Furthermore, all cooperating peer nodes A-D 101-104 can be in full agreement about the names and IP addresses that are relevant for each such peer at any point in time. Additionally, when network configurations, e.g. network configuration 110, is updated dynamically, it is beneficial to ensure that such updates do not lead to inconsistent or failed transactions because some peer has a stale view of what addresses to use.

Figure 2:
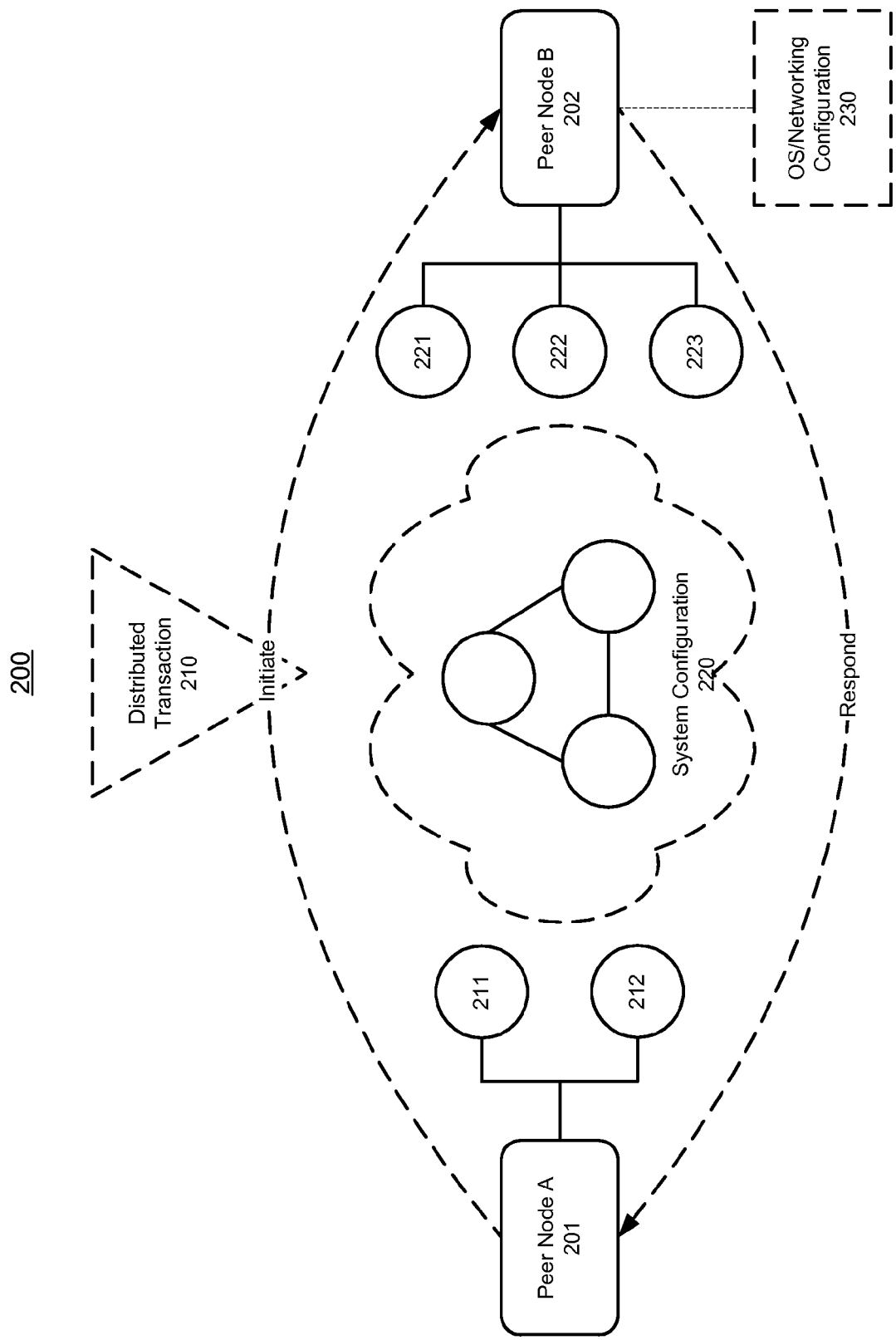
FIG. 2 shows an illustration of ensuring consistent address information for supporting distributed transactions in a middleware machine environment, in accordance with an embodiment of the invention.

FIG. 2 shows an illustration of ensuring consistent address information for supporting distributed transactions in a middleware machine environment, in accordance with an embodiment of the invention. As shown in FIG. 2, a peer node A 201 can initiate a distributed transaction 210 with one or more remote peer nodes, e.g. a peer node B 202, in a middleware machine environment 200. Here, the peer node A 201 is associated with network addresses 211-212, and the peer node 202 is associated with network addresses 221-223.

In order to ensure that the distributed transaction 210 can be carried out using consistent address information, the peer node A 201 can verify that all the other peer nodes, such as the peer node B 202, have exactly the same view of the total system configuration as itself.

In accordance with an embodiment of the invention, the information to be checked by the peer node A 201, which initiates the distributed transaction 210, can include one or more unique names associated with each peer node, a list of networks, and the IP addresses that each peer node is supposed to be reached via for each individual network.

Furthermore, each remote peer node (e.g. the peer node B 202) can ensure that information about itself is consistent with the local OS/networking configuration 230 before responding. Thus, the system can be assured that no administrator error can prevent consistent execution of distributed transactions.

Figure 3:
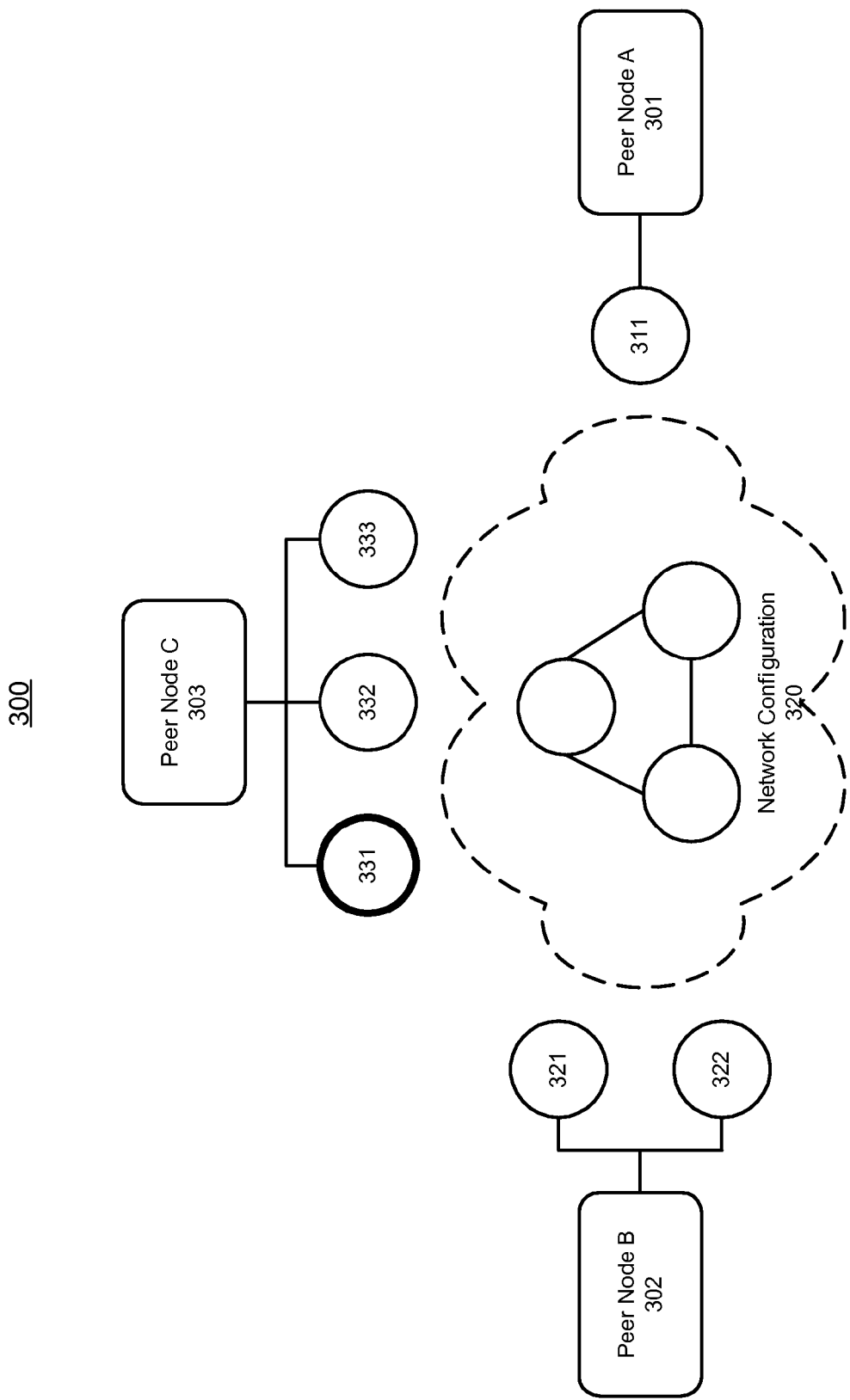
FIG. 3 shows an illustration of supporting distributed transactions when network configuration changes in a middleware machine environment, in accordance with an embodiment of the invention.

FIG. 3 shows an illustration of supporting distributed transactions when network configuration changes in a middleware machine environment, in accordance with an embodiment of the invention. As shown in FIG. 3, a distributed transaction can be performed in a middleware machine environment 300, involving peer nodes A-C 301-303. Here, the peer node A 301 can be associated with a network address 311, while the peer node B 302 can be associated with network addresses 321-322 and the peer node C 303 can be associated with network addresses 331-333.

In accordance with an embodiment of the invention, when a change in the networking configuration 320 happens, the system can bring all cooperating peer nodes A-C 301-303 in synchronization, before any subsequent distributed transactions can be carried out. Additionally, the update of the networking configuration 320 can be either automatic or manual as long as the required consistency can be achieved.

Furthermore, for a fixed set of cooperating peer nodes A-C 301-303 with potential changes in networking address information, the robust consistency check carried out by the system as part of each distributed transaction can be sufficient to ensure that no distributed transaction can be successfully initiated during a period when the network configuration is not consistent among all cooperating peer nodes A-C 301-303.

Also, there can be situations when the set of cooperating nodes A-C 301-303 may not be in synchronization in terms of the list of member nodes itself. The robust consistency checks can ensure that each cooperating node A-C 301-303 can have the same view of what the total set of nodes are, in addition to which addresses are associated with each node. For example, the system can detect a change (or inconsistency) in the network configuration 320 using the above scheme, if the list of cooperating peer nodes is to be changed.

In accordance with an embodiment of the invention, a change (or inconsistency) in the network configuration 320 can be detected synchronously, and the overall configuration information can be checked and updated as appropriate in order to allow the subsequent transactions to take place.

As shown in FIG. 3, a network address 331 can be dynamically changed during the execution of a distributed transaction. This change (or inconsistency) in the network configuration 320 may happen after the relevant address is no longer in use (or the relevant address is never used at all) during the distributed transaction. In these cases, the change (or inconsistency) in the network configuration 320 may not cause any issue for performing the transaction.

Additionally, the change in the network configuration 320 may happen while the address is still being used or before it is used. In such cases, the issue may either be detected by an address probe operation, via an explicit check operation as part of a remote operation, or be handled as a communication failure (e.g. TCP timeout) during the actual communication.

Figure 4:
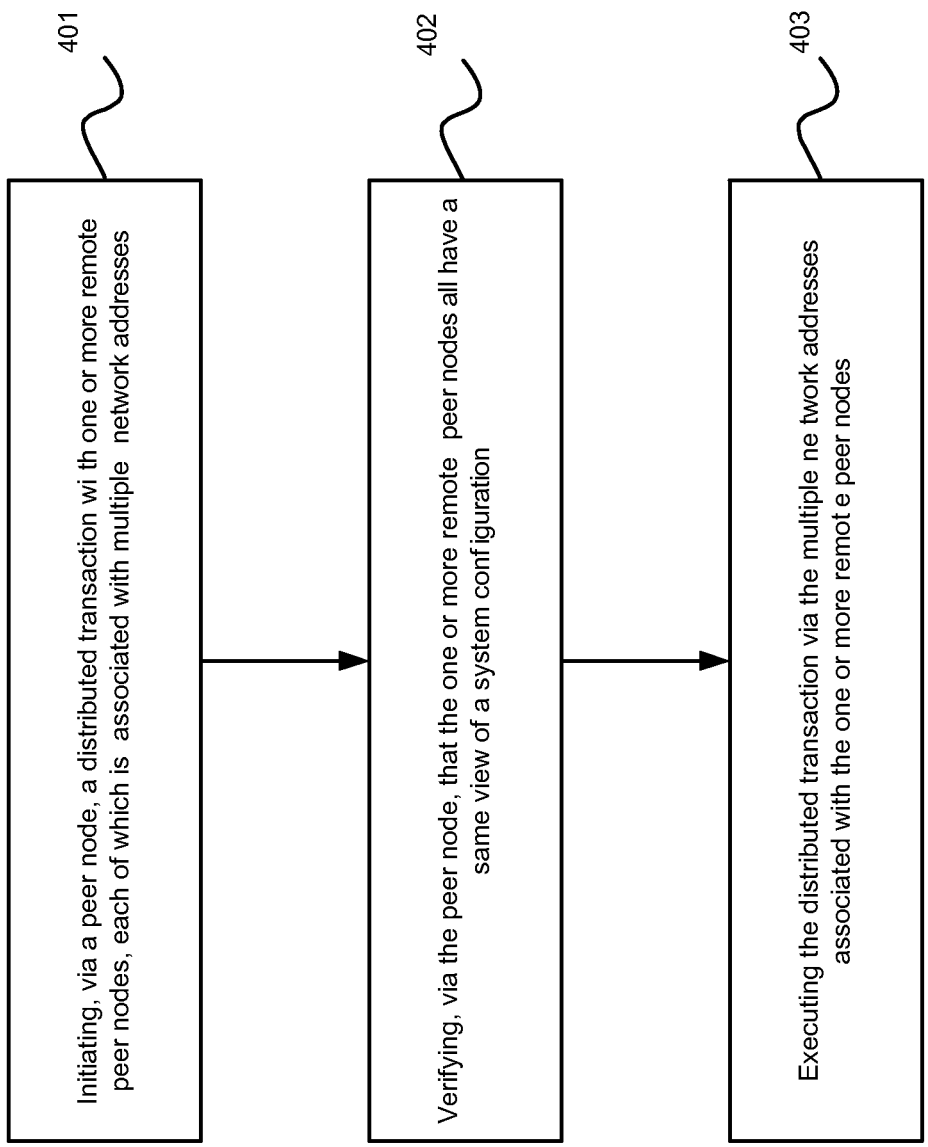
FIG. 4 illustrates an exemplary flow chart for ensuring consistent address information for supporting distributed transaction in a middleware machine environment, in accordance with an embodiment of the invention.

FIG. 4 illustrates an exemplary flow chart for ensuring consistent address information for supporting distributed transactions in a middleware machine environment, in accordance with an embodiment of the invention. As shown in FIG. 4, at step 401, a peer node can initiate one or more distributed transactions with one or more remote peer nodes, each of which can be associated with multiple network addresses. Then, at step 402, the peer node can verify that each remote peer node has a same view of system configuration. Furthermore, at step 403, the system can execute the distributed transactions via the multiple network addresses associated with the remote peer node.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting distributed transactions in a middleware machine environment, comprising:

initiating, via a peer node, a distributed transaction with one or more remote peer nodes, each of which is associated with multiple network addresses;

verifying, via the peer node, as part of the distributed transaction, that the one or more remote peer nodes all have a same view of a network configuration, including, upon a change in the network configuration, ensuring that no distributed transaction is initiated during a period when the network configuration is inconsistent among cooperating peer nodes, synchronizing the cooperating peer nodes before subsequent distributed transactions can be processed, performing one or more network configuration updates automatically or manually, and ensuring that the one or more network configuration updates do not cause either the peer node or the one or more remote peer nodes to have a stale view of the network configuration; and executing the distributed transaction via the multiple network addresses associated with the one or more remote peer nodes.

2. The method according to claim 1, further comprising:
allowing the network configuration to include at least one of
one or more unique names associated with each peer node, a list of networks, and
internet protocol (IP) addresses to reach each peer node.

3. The method according to claim 1, further comprising:
checking, via the one or more remote peer nodes, before responding, whether local system configuration information is consistent with local OS/networking configuration.

4. The method according to claim 1, further comprising:
detecting a change in a list of cooperating peers.

5. The method according to claim 1, further comprising:
dynamically changing the network addresses during the execution of the distributed transaction.

6. The method according to claim 5, further comprising:
using an address probe operation or a communication failure to detect the change of the network addresses, if the change happens while the network addresses are in use.

7. A system for supporting distributed transactions in a middleware machine environment, comprising:
one or more computing devices having microprocessors, and a peer node running on the one or more microprocessors computing devices, wherein the peer node operates to
initiate a distributed transaction with one or more remote peer nodes, each of which is associated with one or more multiple network addresses;
verify, as part of the distributed transaction, that the one or more remote peer nodes all have a same view of a system network configuration, including, upon a change in the network configuration,
ensuring that no distributed transaction is initiated during a period when the network configuration is inconsistent among cooperating peer nodes,
synchronizing the cooperating peer nodes before subsequent distributed transactions can be processed,
performing one or more network configuration updates automatically or manually, and ensuring that the one or more network configuration updates do not cause either the peer node or the one or more remote peer nodes to have a stale view of the network configuration; and
execute the distributed transaction via the one or more multiple network addresses associated with the one or more remote peer nodes.

8. The system according to claim 7, wherein:
the network configuration includes at least one of
one or more unique names associated with each peer node,
a list of networks, and
internet protocol (IP) addresses to reach each peer node.

9. The system according to claim 7, wherein:
before responding, the one or more remote peer nodes check whether local system configuration information is consistent with local OS/networking configuration.

10. The system according to claim 7, wherein:
the peer node operates to detect a change in a list of cooperating peers.

11. The system according to claim 7, wherein:
the network addresses are dynamically changed during the execution of the distributed transaction.

12. A non-transitory machine readable storage medium having instructions stored thereon that when executed cause a system to perform the steps comprising:
initiating, via a peer node, a distributed transaction with one or more remote peer nodes, each of which is associated with multiple network addresses;
verifying, via the peer node, as part of the distributed transaction, that the one or more remote peer nodes all have a same view of a network configuration, including, upon a change in the network configuration,
ensuring that no distributed transaction is initiated during a period when the network configuration is inconsistent among cooperating peer nodes,
synchronizing the cooperating peer nodes before subsequent distributed transactions can be processed,
performing one or more network configuration updates automatically or manually, and
ensuring that the one or more network configuration updates do not cause either the peer node or the one or more remote peer nodes to have a stale view of the network configuration; and
executing the distributed transaction via the multiple network addresses associated with the one or more remote peer nodes.

* * * * *